US012802434B2

(12) United States Patent
Gan et al.

(10) Patent No.: US 12,802,434 B2
(45) Date of Patent: Nov. 17, 2026

(54) FACIAL BEAUTY PREDICTION METHOD AND APPARATUS, AND ELECTRONIC DEVICE AND STORAGE MEDIUM

(71) Applicant: WUYI UNIVERSITY, Jiangmen (CN)

(72) Inventors: Junying Gan, Jiangmen (CN); Xiaoshan Xie, Jiangmen (CN); Guohui He, Jiangmen (CN)

(73) Assignee: Wuyi University, Jiangmen (CN)

( * ) Notice: Subject to any disclaimer, the term of this patent is extended or adjusted under 35 U.S.C. 154(b) by 194 days.

(21) Appl. No.: 18/872,546

(22) PCT Filed: Feb. 28, 2023

(86) PCT No.: PCT/CN2023/078761
§ 371 (c)(1),
(2) Date: Jan. 14, 2025

(87) PCT Pub. No.: WO2023/236594
PCT Pub. Date: Dec. 14, 2023

(65) Prior Publication Data

US 2026/0253397 A1 Aug. 27, 2026

(30) Foreign Application Priority Data

Jun. 9, 2022 (CN) ........................ 202210646405.7

(51) Int. Cl.
*G06V 10/82* (2022.01)
*G06V 10/774* (2022.01)
*G06V 40/16* (2022.01)

(52) U.S. Cl.
CPC ............ *G06V 10/82* (2022.01); *G06V 10/774* (2022.01); *G06V 40/16* (2022.01)

(58) Field of Classification Search
CPC . G06T 2207/30201; G06T 2207/20081; G06T 2211/441; G06V 40/16–179;
(Continued)

(56) References Cited

U.S. PATENT DOCUMENTS 11,126,826 B1 * 9/2021 Karakas ................. G06N 3/047
11,676,407 B2 * 6/2023 Cho ...................... G06F 16/953
382/103
(Continued)

FOREIGN PATENT DOCUMENTS

CN 111695602 A 9/2020
CN 112069916 A * 12/2020 ............ G06N 3/045
(Continued)

OTHER PUBLICATIONS

Xian Wang, Kai Wang, Shiguo Lian, "A Survey on Face Data Augmentation", arXiv:1904.11685v1 [cs.CV] Apr. 26, 2019 (Year: 2019).*
(Continued)

*Primary Examiner* — Atiba O Fitzpatrick
(74) *Attorney, Agent, or Firm* — Vivacqua Crane, PLLC

(57) ABSTRACT

A facial beauty prediction method includes: acquiring an original image and Gaussian noise; generating a fake facial image according to the Gaussian noise; respectively performing a determination on the fake facial image and the original image to obtain a first probability and a second probability; optimizing a generative adversarial network when a difference between the first probability and the second probability is greater than a preset threshold; generating a training set by using the optimized generative adversarial network; and inputting the training set into a facial beauty prediction task network and training the facial beauty prediction task network to obtain a trained first task network.

10 Claims, 4 Drawing Sheets

(58) Field of Classification Search
CPC .......... G06V 10/774–7753; G06N 3/08–0985; G06N 3/094; G06N 3/0475; G06F 18/214–2155; G06F 7/023; G06F 40/16
See application file for complete search history.

(56) References Cited

U.S. PATENT DOCUMENTS

2020/0311475 A1* 10/2020 el Kaliouby .......... G06F 18/214
2021/0089759 A1* 3/2021 Todorov ............... G06V 40/174
2021/0201003 A1* 7/2021 Banerjee .............. G06V 10/774
2021/0241463 A1* 8/2021 Cho ........................ G06T 7/001
2021/0406996 A1* 12/2021 Yu ......................... G06N 3/0464
2022/0121932 A1* 4/2022 Kalarot ............... G06F 3/04845
2023/0086573 A1* 3/2023 Naito ..................... G06V 40/16
382/155
2023/0126695 A1* 4/2023 Hatten ................... G06N 3/045
706/15
2023/0385633 A1* 11/2023 Kobayashi ........... G06N 3/0475
2025/0191345 A1* 6/2025 Cao ........................ G06V 10/82

FOREIGN PATENT DOCUMENTS

CN 112613435 A 4/2021
CN 113705492 A 11/2021
CN 114973377 A 8/2022
WO 2021052159 A1 3/2021

OTHER PUBLICATIONS

International Searching Authority. International Search Report and Written Opinion for PCT Application No. PCT/CN2023/078761 and English translation, mailed Apr. 18, 2023, pp. 1-14.

* cited by examiner

FACIAL BEAUTY PREDICTION METHOD AND APPARATUS, AND ELECTRONIC DEVICE AND STORAGE MEDIUM

CROSS-REFERENCE TO RELATED APPLICATIONS

This application is a national stage filing under 35 U.S.C. § 371 of international application No. PCT/CN2023/078761, filed Feb. 28, 2023, which claims priority to Chinese patent application No. 202210646405.7 filed Jun. 9, 2022. The contents of these applications are incorporated herein by reference in their entirety.

TECHNICAL FIELD

The present disclosure relates to the technical field of neural networks, and in particular, to a method and system for facial beauty prediction based on a generative adversarial network, and a storage medium.

BACKGROUND

Facial beauty prediction is a cutting-edge topic in the field of machine learning and computer vision, and mainly studies how to make computers have a facial-beauty judging ability like human beings. However, due to the lack of a large-scale face database for supervised training of neural networks, there is insufficient supervision information, making the model prone to overfitting.

SUMMARY

A main objective of embodiments of the present disclosure is to provide a method and apparatus for facial beauty prediction, an electronic device, and a computer-readable storage medium, which can effectively solve the problem that the model is prone to overfitting due to insufficient supervision information in facial beauty prediction research.

To achieve the above objective, in accordance with a first aspect of the present disclosure, an embodiment provides a method for facial beauty prediction, including:

- acquiring an original image and Gaussian noise;
- generating a fake facial image according to the Gaussian noise;
- respectively performing a determination on the fake facial image and the original image to obtain a first probability and a second probability, where the first probability represents a probability that the fake facial image is determined to be a real image, and the second probability represents a probability that the original image is determined to be a real image;
- optimizing a generative adversarial network in response to a difference between the first probability and the second probability being greater than a preset threshold;
- generating a training set by using the optimized generative adversarial network, wherein the training set includes a plurality of training samples, and each of the training samples includes a label reflecting a facial beauty level of the training sample; and
- inputting the training set into a facial beauty prediction task network and training the facial beauty prediction task network to obtain a trained first task network.

In some embodiments, the generative adversarial network includes a generation module and a determining module, and optimizing the generative adversarial network includes:

- reducing a static gradient of the generation module to update the generation module; and
- increasing a static gradient of the determining module to update the determining module,
- where the generation module is updated according to an expression $$\nabla_{\theta_g} \frac{1}{n} \sum_{i=1}^{n} \log\left(1 - D\left(G\left(z^{(i)}\right)\right)\right),$$

and the determining module is updated according to an expression $$\nabla_{\theta_d} \frac{1}{n} \sum_{i=1}^{n} \left[\log D\left(x^{(i)}\right) + \log\left(1 - D\left(G\left(z^{(i)}\right)\right)\right)\right],$$

where D represents the determining module, G represents the generation module, $\nabla_{\theta_g}$ represents the static gradient of the generation module, $\nabla_{\theta_d}$ represents the static gradient of the determining module, $x^{(i)}$ represents an $i^{th}$ sample in the original image, and $z^{(i)}$ represents an $i^{th}$ sample in the fake facial image.

In some embodiments, inputting the training set into a facial beauty prediction task network and training the facial beauty prediction task network includes:

- decomposing a facial beauty prediction task into a plurality of binary classification sub-tasks, and generating a plurality of first sub-task networks respectively corresponding to the binary classification sub-tasks;
- generating a multi-dimensional label according to the facial beauty level label of each of the training samples, where each dimension of the multi-dimensional label is respectively used for supervising a corresponding one of the first sub-task networks, and a total number of dimensions of the multi-dimensional label is equal to a total number of the first sub-task networks; and
- performing supervised learning on the plurality of first sub-task networks according to the multi-dimensional label to obtain a plurality of trained second sub-task networks.

In some embodiments, performing supervised learning on the plurality of first sub-task networks according to the multi-dimensional label includes:

- determining whether an output result of each of the first sub-task networks is equal to a corresponding dimension in the multi-dimensional label.

In some embodiments, after performing supervised learning on the plurality of first sub-task networks according to the multi-dimensional label to obtain a plurality of trained second sub-task networks, the method further includes:

- integrating first output results of the plurality of trained second sub-task networks into a first multi-dimensional vector;
- comparing the first multi-dimensional vector with a second multi-dimensional vector to determine whether the first multi-dimensional vector is erroneous;
- in response to the first multi-dimensional vector corresponding to the second multi-dimensional vector, determining that the first multi-dimensional vector is correct; and
- in response to the first multi-dimensional vector not corresponding to the second multi-dimensional vector, correcting the first multi-dimensional vector according to the plurality of first output results.

In some embodiments, correcting the first multi-dimensional vector according to the plurality of first output results includes:

correcting the first multi-dimensional vector by correcting the first output results according to a preset rule, where the preset rule is: correcting the first output results based on a principle that a minimum number of the first output results are modified and a confidence level of the modified first output result is the lowest.

In some embodiments, inputting the training set into a facial beauty prediction task network and training the facial beauty prediction task network includes:

cyclically optimizing parameters of the first sub-task networks using a back propagation algorithm.

In accordance with a second aspect of the present disclosure, an embodiment provides an apparatus for facial beauty prediction, including:

an acquisition module, configured for acquiring an original image and Gaussian noise;

a generation module, configured for generating a fake facial image according to the Gaussian noise;

a determining module, configured for respectively performing a determination on the fake facial image and the original image to obtain a first probability and a second probability;

a generative adversarial network optimization module, configured for optimizing a generative adversarial network when a difference between the first probability and the second probability is greater than a preset threshold;

a training set generation module, configured for generating a training set by using the optimized generative adversarial network; and a training module, configured for inputting the training set into a facial beauty prediction task network and training the facial beauty prediction task network to obtain a trained first task network.

In accordance with a third aspect of the present disclosure, an embodiment provides an electronic device, including a memory, a processor, a program stored in the memory and executable by the processor, and a data bus configured for implementing connection and communication between the processor and the memory, where the program, when executed by the processor, causes the processor to implement the method for facial beauty prediction in accordance with any one of the embodiments of the first aspect of the present disclosure.

In accordance with a fourth aspect of the present disclosure, an embodiment provides a computer-readable storage medium, storing one or more programs which, when executed by one or more processors, cause the one or more processors to implement the method for facial beauty prediction in accordance with any one of the embodiments of the first aspect of the present disclosure.

According to the method and apparatus for facial beauty prediction, the electronic device, and the computer-readable storage medium provided in the embodiments of the present disclosure, an original image and Gaussian noise are acquired; a fake facial image is generated according to the Gaussian noise; a determination is respectively performed on the fake facial image and the original image to obtain a first probability and a second probability; a generative adversarial network is optimized when a difference between the first probability and the second probability is greater than a preset threshold; a training set is generated by using the optimized generative adversarial network; and the training set is inputted into a facial beauty prediction task network and the facial beauty prediction task network is trained to obtain a trained first task network. By continuously optimizing the generative adversarial network to enable the generative adversarial network to output fake facial images with high similarity to real facial images, constructing a training set according to the outputted fake facial images, and training the facial beauty prediction task network with the training set, the problem that the model is prone to overfitting due to insufficient supervision information in facial beauty prediction research can be solved.

DETAILED DESCRIPTION

Figure 1:
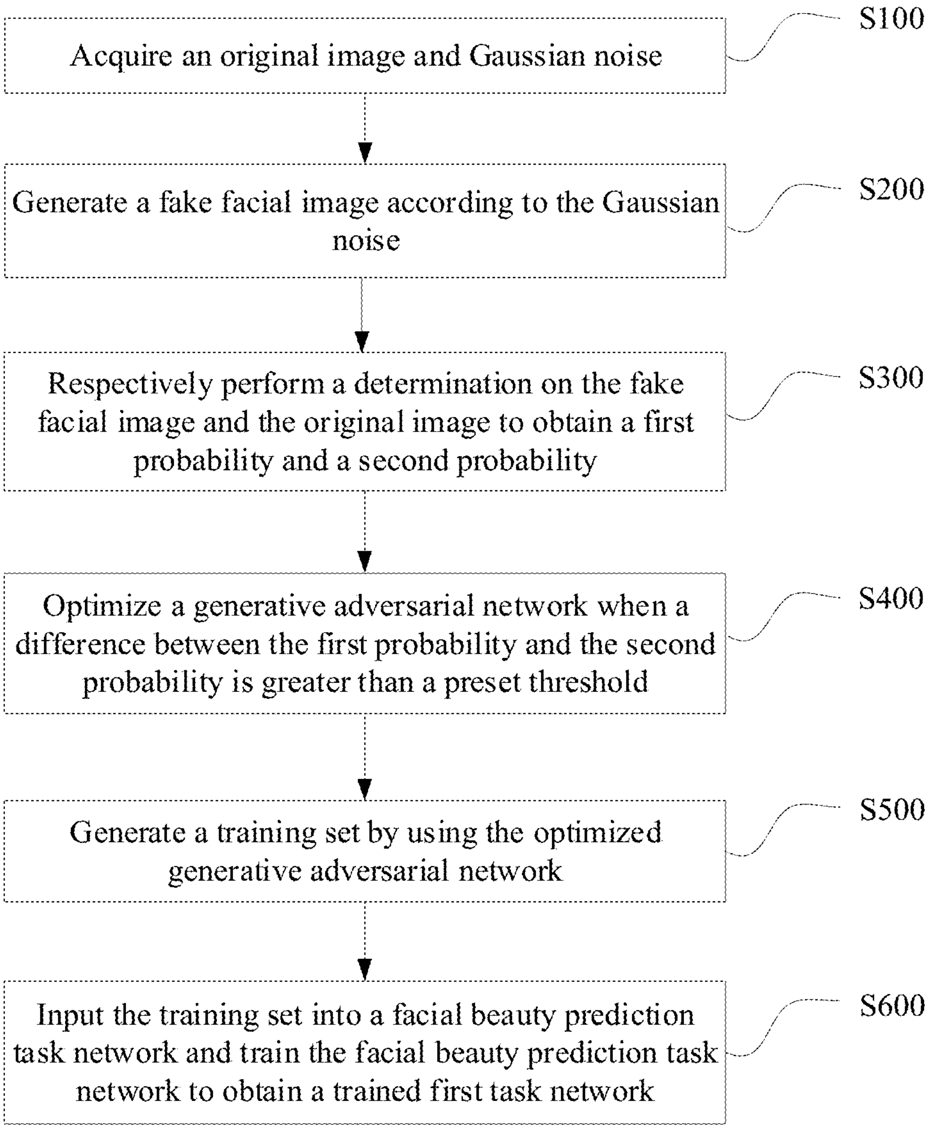
FIG. 1 is a flowchart of a method for facial beauty prediction according to an embodiment of the present disclosure.

To make the objectives, technical schemes, and advantages of the present disclosure clear, the present disclosure is described in further detail in conjunction with accompanying drawings and embodiments. It should be understood that the specific embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

Unless otherwise defined, meanings of all technical and scientific terms used in this description are the same as those usually understood by those having ordinary skills in the art to which the present disclosure belongs. Terms used in this description are merely used to describe objectives of the embodiments of the present disclosure, but are not intended to limit the present disclosure.

In addition, the described features, structures or characteristics may be combined in one or more embodiments in any appropriate manner. In the following description, many specific details are provided to enable a thorough understanding of the embodiments of the present disclosure. However, it will be appreciated by those having ordinary skills in the art that the technical schemes of the present disclosure may be practiced without one or more of the specific details, or other methods, components, apparatuses, steps, etc., may be employed. In other cases, well-known methods, apparatuses, implementations, or operations are not shown or described in detail, to avoid obscuring aspects of the present disclosure.

The block diagrams shown in the drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the drawings are illustrative only, and neither indicate that all the contents and operations/steps must be included, nor indicate that the operations/steps must be executed in the order described. For example, some operations/steps may further be decomposed, combined or partially combined, so the actual order of execution may change according to actual situations.

The embodiments of the present disclosure may be used in a wide variety of general purpose or special purpose computer system environments or configurations, for example, personal computers (PCs), server computers, handheld or portable devices, tablet-type devices, multiprocessor systems, microprocessor-based systems, set-top boxes, programmable consumer electronic devices, network PCs, midrange computers, mainframe computers, distributed computing environments including any of the above systems or devices, etc. The present disclosure may be described in the general context of computer-executable instructions executed by a computer, for example, program modules. Generally, the program modules include routines, programs, objects, components, data structures, and the like for performing specific tasks or implementing specific abstract data types. The present disclosure may also be practiced in distributed computing environments in which tasks are performed by remote processing devices connected through a communication network. In a distributed computing environment, program modules may be located in local and remote storage media, including storage devices.

Referring to FIG. 1, in accordance with a first aspect of the present disclosure, an embodiment provides a method for facial beauty prediction, including, but not limited to, the following steps S100 to S600.

At S100, an original image and Gaussian noise are acquired.

In some embodiments, in S100, an original image and Gaussian noise are acquired, where the Gaussian noise and the original image may be stored in a system in advance or may be inputted from outside. The original image refers to a real facial image captured by a photographing device or other means.

At S200, a fake facial image is generated according to the Gaussian noise.

In some embodiments, in S200, a fake facial image is generated according to the Gaussian noise. After receiving the Gaussian noise, a generator of a generative adversarial network generates a fake facial image according to the Gaussian noise.

At S300, a determination is respectively performed on the fake facial image and the original image to obtain a first probability and a second probability.

In some embodiments, in S300, a determination is respectively performed on the fake facial image and the original image to obtain a first probability and a second probability, where the first probability represents a probability that the fake facial image is determined to be a real image, and the second probability represents a probability that the original image is determined to be a real image. The fake facial image generated by the generator of the generative adversarial network and the original image are inputted to a discriminator together. After receiving the images, the discriminator determines the source of the image to obtain a probability of whether the image is a fake image generated by the generator or a real facial image obtained by photographing or other means. For example, when the image generated by the generator does not have a basic face feature, the discriminator determines that a probability of the image being a real facial image is close to 0; or when the image generated by the generator is very realistic and is as real as a real photo obtained by photographing, the discriminator is unable to distinguish the source of the image, and can only make a blind guess. In this case, the probability of the fake facial image generated by the generator being determined to be a real facial image will be close to 50%.

At S400, a generative adversarial network is optimized when a difference between the first probability and the second probability is greater than a preset threshold.

In some embodiments, in S400, a generative adversarial network is optimized when a difference between the first probability and the second probability is greater than a preset threshold. The preset threshold is a very small value (e.g., 0.1%). When the difference between the first probability and the second probability outputted by the discriminator is greater than the preset threshold, i.e., when the discriminator can well distinguish that the fake facial image generated by the generator is not a real facial image, indicating that the image generated by the generator is not realistic enough to deceive the discriminator. Therefore, the generator should be optimized to improve the quality of the fake facial image generated by the generator. In addition, as the quality of the fake facial image generated by the generator is improved, the discriminator also needs to be optimized, such that the discriminator can better distinguish whether an image is a fake facial image generated by the generator or a real facial image. When the probability that the discriminator determines a fake facial image generated by the generator to be a real facial image and the probability that the discriminator determines an original image to be a real facial image are very close or even equal, it means that the discriminator can no longer distinguish whether the fake facial image generated by the generator is a real facial image, i.e., the fake facial image generated by the generator is very realistic and can be confused with a real facial image. Thus, a well-trained generator is obtained, which can be used to generate a large number of realistic facial images as face data to build a database.

At S500, a training set is generated by using the optimized generative adversarial network.

In some embodiments, in S500, a training set is generated by using the optimized generative adversarial network. In the above steps, an optimized generator capable of generating images very close to real faces has been obtained through the continuous game between the generator and the discriminator in the generative adversarial network. In this case, a series of facial images may be generated through the generative adversarial network, and the facial images are used to form a set, i.e., a training set, where the training set includes a plurality of training samples, and each of the training samples includes a label reflecting a facial beauty level of the training sample.

At S600, the training set is inputted into a facial beauty prediction task network and the facial beauty prediction task network is trained to obtain a trained first task network.

In some embodiments, in S600, the training set is inputted into a facial beauty prediction task network and the facial beauty prediction task network is trained to obtain a trained first task network. The facial beauty prediction task network may be a Convolutional Neural Networks (CNN). The training set generated in S500 and including a large number of facial images and facial beauty level labels respectively corresponding to the facial images is used as an input for supervised training of the CNN to obtain a well-trained neural network for implementing facial beauty prediction tasks.

Figure 2:
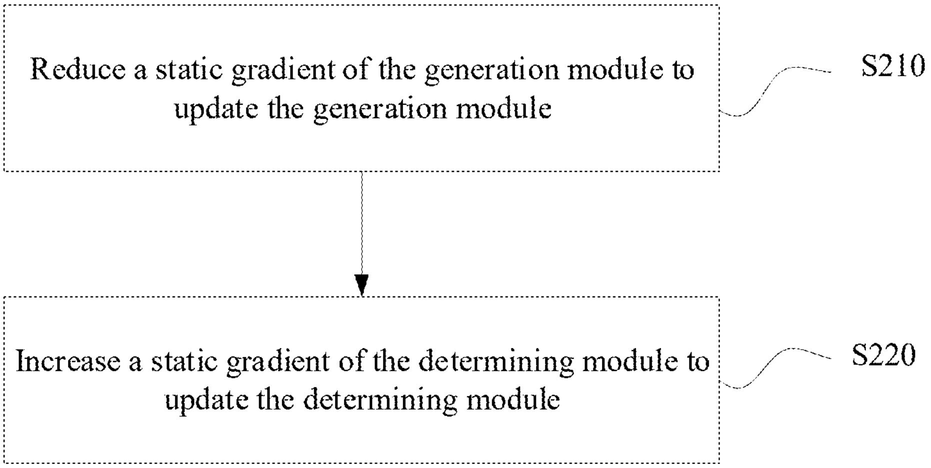
FIG. 2 is a flowchart of S400 in FIG. 1.

In some embodiments, the generative adversarial network includes a generation module and a determining module, and as shown in FIG. 2, S400 includes, but is not limited to, the following steps S210 to S220.

At S210, a static gradient of the generation module is reduced to update the generation module.

In some embodiments, in S210, a static gradient of the generation module is reduced to update the generation module. For example, the generation module is updated according to an expression $$\nabla_{\theta_g} \frac{1}{n} \sum_{i=1}^{n} \log\left(1 - D\left(G\left(z^{(i)}\right)\right)\right),$$

where D represents the determining module, G represents the generation module, $\nabla_{\theta_g}$ represents the static gradient of the generation module, and $z^{(i)}$ represents an $i^{th}$ sample in the fake facial image.

At S220, a static gradient of the determining module is increased to update the determining module.

In some embodiments, in S220, a static gradient of the determining module is increased to update the determining module. For example, the determining module is updated according to an expression $$\nabla_{\theta_d} \frac{1}{n} \sum_{i=1}^{n} \left[\log D\left(x^{(i)}\right) + \log\left(1 - D\left(G\left(z^{(i)}\right)\right)\right)\right],$$

where D represents the determining module, G represents the generation module, $\nabla_{\theta_d}$ represents the static gradient of the determining module, $x^{(i)}$ represents an $i^{th}$ sample in the original image, and $z^{(i)}$ represents an $i^{th}$ sample in the fake facial image.

Figure 3:
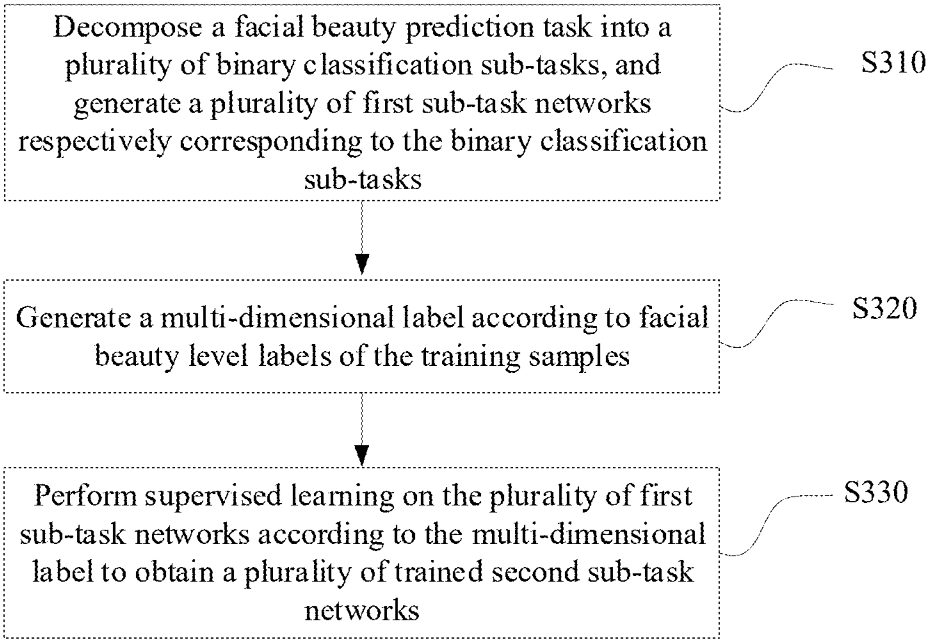
FIG. 3 is a flowchart of S300 in FIG. 1.

In some embodiments, as shown in FIG. 3, S600 includes, but is not limited to, the following steps S310 to S330.

At S310, a facial beauty prediction task is decomposed into a plurality of binary classification sub-tasks, and a plurality of first sub-task networks respectively corresponding to the binary classification sub-tasks are generated.

In some embodiments, in S310, a facial beauty prediction task is decomposed into a plurality of binary classification sub-tasks, and a plurality of first sub-task networks respectively corresponding to the binary classification sub-tasks are generated. As such, prediction learning of multiple tasks may be performed using data of a single task.

At S320, a multi-dimensional label is generated according to facial beauty level labels of the training samples.

In some embodiments, in S320, a multi-dimensional label is generated according to facial beauty level labels of the training samples, where each dimension of the multi-dimensional label corresponds to one of the first sub-task networks, each dimension of the multi-dimensional label is respectively used for supervising the corresponding first sub-task network, and a total number of dimensions of the multi-dimensional label is equal to a total number of the first sub-task networks.

At S330, supervised learning is performed on the plurality of first sub-task networks according to the multi-dimensional label to obtain a plurality of trained second sub-task networks.

In some embodiments, in S330, supervised learning is performed on the plurality of first sub-task networks according to the multi-dimensional label to obtain a plurality of trained second sub-task networks, and each dimension of the multi-dimensional label is used to supervise the corresponding sub-task network. For example, it is determined whether an output result of each of the first sub-task networks is equal to a corresponding dimension in the multi-dimensional label, and parameters of the first sub-task networks are cyclically optimized using a back propagation algorithm.

Figure 4:
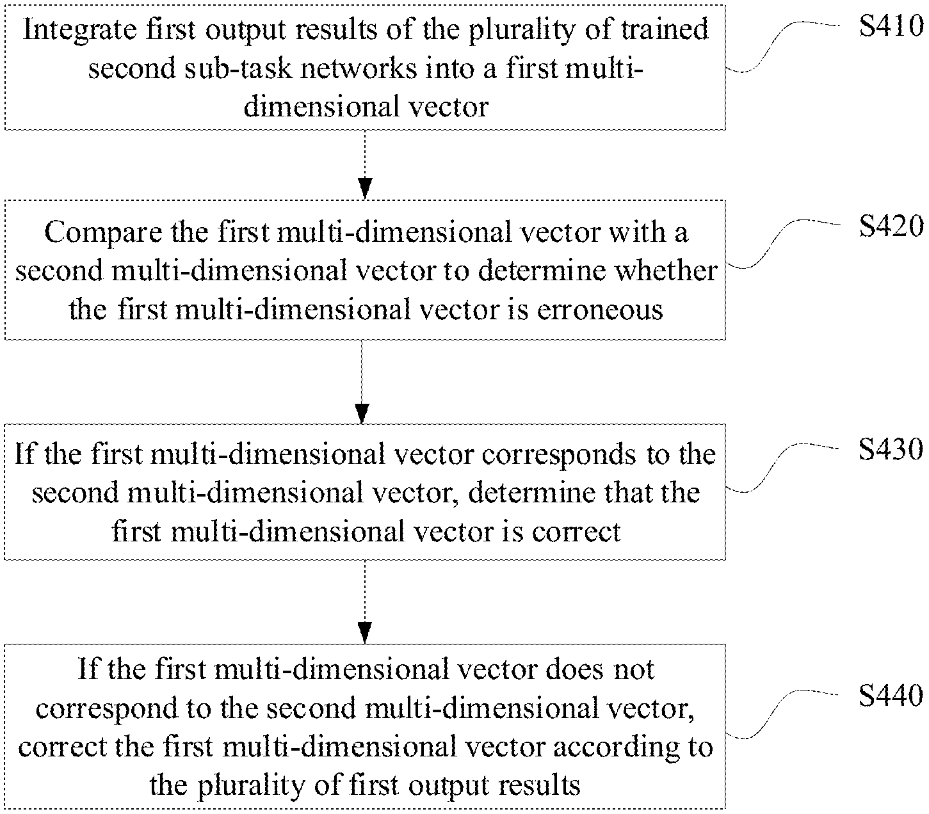
FIG. 4 is a flowchart of S330 in FIG. 1.

In some embodiments, as shown in FIG. 4, after S330, the method further includes, but is not limited to, the following steps S410 to S440.

At S410, first output results of the plurality of trained second sub-task networks are integrated into a first multi-dimensional vector.

In some embodiments, in S410, first output results of the plurality of trained second sub-task networks are integrated into a first multi-dimensional vector. In the above steps, after the facial beauty prediction task is decomposed into a plurality of binary classification sub-tasks, each sub-task can output a result, and then the output results of the plurality of sub-task networks are integrated to obtain a multi-dimensional vector. For example, the number of sub-task networks is 3, and the output results of the sub-task networks are respectively 1, 1, and 0, a multi-dimensional vector [1, 1, 0] may be obtained.

At S420, the first multi-dimensional vector is compared with a second multi-dimensional vector to determine whether the first multi-dimensional vector is erroneous.

In some embodiments, in S420, the first multi-dimensional vector is compared with a second multi-dimensional vector to determine whether the first multi-dimensional vector is erroneous. In S410, the output results of the sub-task networks are integrated to obtain the first multi-dimensional vector. The first multi-dimensional vector is compared with the second multi-dimensional vector. The second multi-dimensional vector includes cases corresponding to a plurality of different facial beauty levels, e.g., may include [0, 1, 0], [1, 0, 0], and [1, 1, 0] respectively corresponding to facial beauty levels 1, 2, and 3.

At S430, if the first multi-dimensional vector corresponds to the second multi-dimensional vector, it is determined that the first multi-dimensional vector is correct.

At S440, if the first multi-dimensional vector does not correspond to the second multi-dimensional vector, the first multi-dimensional vector is corrected according to the plurality of first output results.

In some embodiments, in S440, if the first multi-dimensional vector does not correspond to the second multi-dimensional vector, the first multi-dimensional vector is corrected according to the plurality of first output results. If it is determined by comparing the first multi-dimensional vector with the second multi-dimensional vector that the first multi-dimensional vector does not belong to any case of the second multi-dimensional vector, for example, the first multi-dimensional vector is [0, 0, 0] and does not match any case of the second multi-dimensional vector, it means that the first multi-dimensional vector is erroneous. In this case, the first multi-dimensional vector is corrected by correcting the first output results according to a preset rule. The preset rule is: correcting the first output results based on a principle that a minimum number of the first output results are modified and a confidence level of the modified first output result is the lowest. Because the first output results are all Boolean elements, the first output results can be corrected by changing 0 to 1 or changing 1 to 0. It can be learned by comparing the first multi-dimensional vector [0, 0, 0] with the second multi-dimensional vector that to correct the first multi-dimensional vector to conform to the second multi-dimensional vector, only one element, i.e., the first element or the second element, in the first multi-dimensional vector needs to be corrected. In this case, confidence levels of the output results of the sub-task networks respectively corresponding to the first element and the second element are compared, and the output result with the lower confidence level is corrected.

According to the method for facial beauty prediction provided in the embodiments of the present disclosure, an original image and Gaussian noise are acquired; a fake facial image is generated according to the Gaussian noise; a determination is respectively performed on the fake facial image and the original image to obtain a first probability and a second probability, where the first probability represents a probability that the fake facial image is determined to be a real image, and the second probability represents a probability that the original image is determined to be a real image; a generative adversarial network is optimized when a difference between the first probability and the second probability is greater than a preset threshold; a training set is generated by using the optimized generative adversarial network, where the training set includes a plurality of training samples, and each of the training samples includes a label reflecting a facial beauty level of the training sample; and the training set is inputted into a facial beauty prediction task network and the facial beauty prediction task network is trained to obtain a trained first task network. By optimizing the generative adversarial network to enable the generative adversarial network to generate highly realistic facial images, generating a training set according to the highly realistic facial images, and transmitting the training set to the facial beauty prediction task network to train the facial beauty prediction task network, the problem that the model being prone to overfitting in the case of insufficient supervision information due to the lack of a large-scale facial beauty database for supervised training of neural networks in facial beauty prediction research can be solved.

Figure 5:
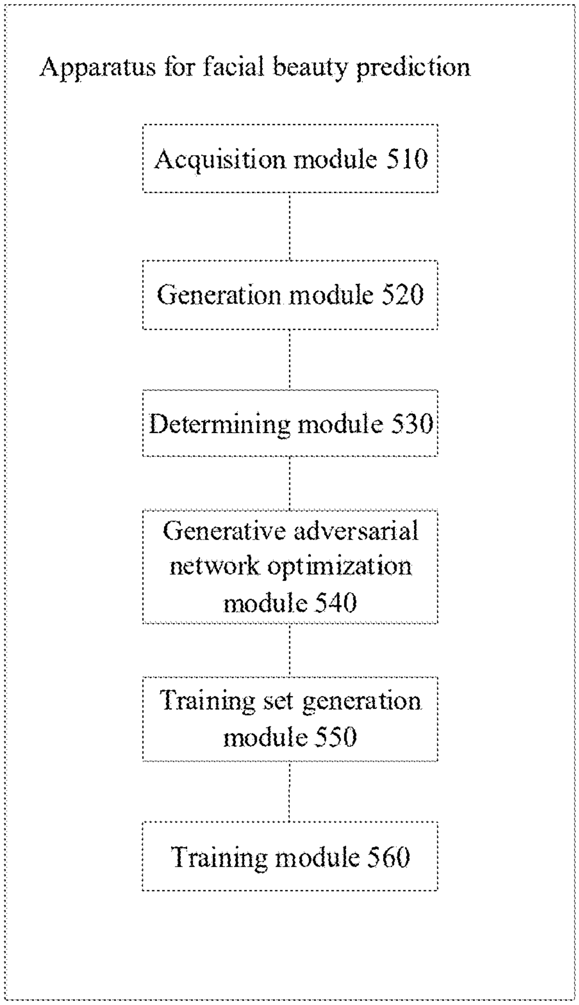
FIG. 5 is a structural block diagram of an apparatus for facial beauty prediction according to an embodiment of the present disclosure.

An embodiment of the present disclosure provides an apparatus for facial beauty prediction, which, as shown in FIG. 5, can implement the method for facial beauty prediction. The apparatus for facial beauty prediction includes: an acquisition module 510, configured for acquiring an original image and Gaussian noise; a generation module 520, configured for generating a fake facial image according to the Gaussian noise; a determining module 530, configured for respectively performing a determination on the fake facial image and the original image to obtain a first probability and a second probability; a generative adversarial network optimization module 540, configured for optimizing a generative adversarial network when a difference between the first probability and the second probability is greater than a preset threshold; a training set generation module 550, configured for generating a training set by using the optimized generative adversarial network; and a training module 560, configured for inputting the training set into a facial beauty prediction task network and training the facial beauty prediction task network to obtain a trained first task network.

The apparatus for facial beauty prediction according to the embodiment of the present disclosure is configured for executing the method for facial beauty prediction according to the above embodiments. The specific processing procedure of the apparatus for facial beauty prediction is the same as that of the method for facial beauty prediction according to the above embodiments, so the details will not be repeated herein.

An embodiment of the present disclosure provides an electronic device 600, including:

at least one processor; and a memory communicatively connected to the at least one processor, where:

the memory stores an instruction which, when executed by the at least one processor, causes the at least one processor to implement the method in accordance with any one of the embodiments of the first aspect of the present disclosure.

Figure 6:
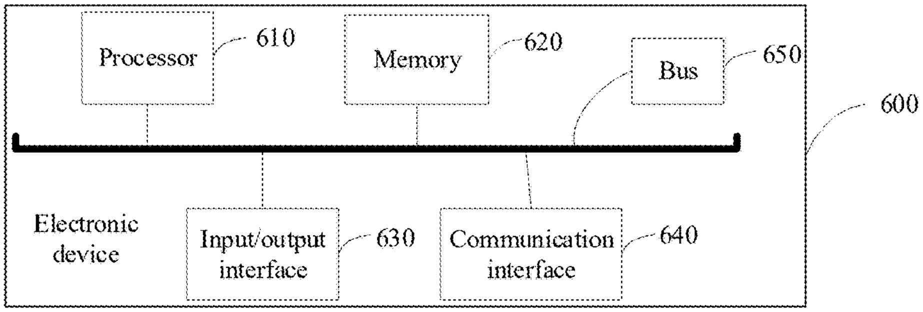
FIG. 6 is a schematic structural diagram of hardware of an electronic device according to an embodiment of the present disclosure.

The hardware structure of the electronic device 600 will be described in detail below in conjunction with FIG. 6. The device includes a processor 610, a memory 620, an input/output interface 630, a communication interface 640, and a bus 650.

The processor 610 may be implemented by a general-purpose Central Processing Unit (CPU), a microprocessor, an Application Specific Integrated Circuit (ASIC), or one or more integrated circuits, and is configured for executing a related program to implement the technical schemes provided by the embodiments of the present disclosure.

The memory 620 may be implemented in the form of a Read Only Memory (ROM), a static storage device, a dynamic storage device, a Random Access Memory (RAM), etc. The memory 620 may store an operating system and other application programs. When the technical schemes provided by the embodiments of the present disclosure are implemented by software or firmware, related program code is stored in the memory 620, and is called by the processor 610 to cause the processor 610 to implement the method for facial beauty prediction according to the embodiments of the present disclosure.

The input/output interface 630 is configured for enabling input and output of information.

The communication interface 640 is configured for realizing communication interaction between the electronic device and other devices, either through wired communication (e.g., USB, network cable, etc.) or through wireless communication (e.g., mobile network, Wi-Fi, Bluetooth, etc.).

The bus 650 is configured for transmitting information between components of the electronic device (such as the processor 610, the memory 620, the input/output interface 630, and the communication interface 640).

The processor 610, the memory 620, the input/output interface 630, and the communication interface 640 are in communication connection with each other inside the electronic device through the bus 650.

The contents described in the embodiments of the present disclosure are for the purpose of illustrating the technical schemes of the embodiments of the present disclosure more clearly, and do not constitute a limitation to the technical schemes provided in the embodiments of the present disclosure. Those having ordinary skills in the art may know that with the evolution of technologies and the emergence of new application scenarios, the technical schemes provided in the embodiments of the present disclosure are also applicable to similar technical problems.

Those having ordinary skills in the art may understand that the technical schemes shown in FIG. 1 to FIG. 6 do not constitute a limitation to the embodiments of the present disclosure, and more or fewer steps than those shown in the figure may be included, or some steps may be combined, or different steps may be used.

The apparatus embodiments described above are merely examples. The units described as separate components may or may not be physically separated, i.e., they may be located in one place or may be distributed over a plurality of network units. Some or all of the modules may be selected according to actual needs to achieve the objectives of the schemes of the embodiments of the present disclosure.

Those having ordinary skills in the art can understand that all or some of the steps in the methods disclosed above and the functional modules/units in the system and the apparatus can be implemented as software, firmware, hardware, and appropriate combinations thereof.

In the description and accompanying drawings of the present disclosure, the terms "first", "second", "third", "fourth", and so on (if any) are intended to distinguish between similar objects but do not necessarily indicate a specific sequence or a precedence order. It is to be understood that the data termed in such a way are interchangeable in appropriate circumstances, such that the embodiments of the present disclosure described herein can be implemented in orders other than the order illustrated or described herein. Moreover, the terms "include," "comprise," and any other variants thereof are intended to cover a non-exclusive inclusion. For example, a process, method, system, product, or device that includes a list of steps or units is not necessarily limited to those expressly listed steps or units, but may include other steps or units not expressly listed or inherent to such a process, method, product, or device.

It is to be understood that in the present disclosure, "at least one" means one or more and "a plurality of" means two or more. The term "and/or" is used for describing an association between associated objects and representing that three associations may exist. For example, "A and/or B" may indicate that only A exists, only B exists, and both A and B exist, where A and B may be singular or plural. The character "/" generally indicates an "or" relation between the associated objects. "At least one of" and similar expressions refer to any combination of items listed, including one item or any combination of a plurality of items. For example, at least one of a, b, or c may represent a, b, c, "a and b", "a and c", "b and c", or "a, b, and c", where a, b, and c may be singular or plural.

In the several embodiments provided in the present disclosure, it is to be understood that the disclosed apparatus and method may be implemented in other manners. For example, the described apparatus embodiments are only exemplary. For example, the division of the units is merely a logical function division and other division manners may be used in practical implementations. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate. Parts displayed as units may or may not be physical units, and may be located in one place, or may be distributed over a plurality of network units. Some or all of the units may be selected according to actual needs to achieve the objectives of the schemes of the embodiments of the present disclosure.

In addition, functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

The integrated unit may be stored in a computer-readable storage medium if implemented in the form of a software functional unit and sold or used as an independent product. Based on such an understanding, the technical schemes of the present disclosure essentially, or the part contributing to the related art, or all or some of the technical schemes may be implemented in the form of a software product. The software product is stored in a computer-readable storage medium, and includes several instructions for instructing a computer device (which may be a personal computer, a server, a network device, or the like) to execute all or some of the steps of the methods described in the embodiments of the present disclosure. The foregoing computer-readable storage medium includes: any medium that can store program code, such as a USB flash drive, a removable hard disk, a ROM, a RAM, a magnetic disk, or an optical disk.

Although some embodiments of the present disclosure are described above with reference to the accompanying drawings, these embodiments are not intended to limit the protection scope of the embodiments of the present disclosure. Any modifications, equivalent replacements and improvements made by those having ordinary skills in the art without departing from the scope and essence of the embodiments of the present disclosure shall fall within the protection scope of the embodiments of the present disclosure.

What is claimed is:

1. A method for facial beauty prediction based on a generative adversarial network, comprising:

acquiring an original image and Gaussian noise;

generating a fake facial image according to the Gaussian noise;

respectively performing a determination on the fake facial image and the original image to obtain a first probability and a second probability, wherein the first probability represents a probability that the fake facial image is determined to be a real image, and the second probability represents a probability that the original image is determined to be a real image;

optimizing the generative adversarial network in response to a difference between the first probability and the second probability being greater than a preset threshold;

generating a training set by using the optimized generative adversarial network, wherein the training set comprises a plurality of training samples, and each of the training samples comprises a label reflecting a facial beauty level of the training sample; and inputting the training set into a facial beauty prediction task network and training the facial beauty prediction task network to obtain a trained first task network.

2. The method for facial beauty prediction of claim 1, wherein the generative adversarial network comprises a generation module and a determining module, and optimizing the generative adversarial network comprises:

reducing a static gradient of the generation module to update the generation module; and increasing a static gradient of the determining module to update the determining module, wherein the generation module is updated according to an expression $$\nabla_{\theta_g}\frac{1}{n}\sum_{i=1}^{n}\log\left(1-D\left(G\left(z^{(i)}\right)\right)\right),$$

and the determining module is updated according to an expression $$\nabla_{\theta_d}\frac{1}{n}\sum_{i=1}^{n}\left[\log D\left(x^{(i)}\right)+\log\left(1-D\left(G\left(z^{(i)}\right)\right)\right)\right],$$

wherein D represents the determining module, G represents the generation module, $\nabla_{\theta_g}$ represents the static gradient of the generation module, $\nabla_{\theta_d}$ represents the static gradient of the determining module, $x^{(i)}$ represents an $i^{th}$ sample in the original image, and $z^{(i)}$ represents an $i^{th}$ sample in the fake facial image.

3. The method for facial beauty prediction of claim 1, wherein inputting the training set into a facial beauty prediction task network and training the facial beauty prediction task network comprises:

decomposing a facial beauty prediction task into a plurality of binary classification sub-tasks, and generating a plurality of first sub-task networks respectively corresponding to the binary classification sub-tasks;

generating a multi-dimensional label according to the facial beauty level label of each of the training samples, wherein each dimension of the multi-dimensional label is respectively used for supervising a corresponding one of the first sub-task networks, and a total number of dimensions of the multi-dimensional label is equal to a total number of the first sub-task networks; and performing supervised learning on the plurality of first sub-task networks according to the multi-dimensional label to obtain a plurality of trained second sub-task networks.

4. The method for facial beauty prediction of claim 3, wherein performing supervised learning on the plurality of first sub-task networks according to the multi-dimensional label comprises:

determining whether an output result of each of the first sub-task networks is equal to a corresponding dimension in the multi-dimensional label.

5. The method for facial beauty prediction of claim 3, wherein after performing supervised learning on the plurality of first sub-task networks according to the multi-dimensional label to obtain a plurality of trained second sub-task networks, the method further comprises:

integrating first output results of the plurality of trained second sub-task networks into a first multi-dimensional vector;

comparing the first multi-dimensional vector with a second multi-dimensional vector to determine whether the first multi-dimensional vector is erroneous;

in response to the first multi-dimensional vector corresponding to the second multi-dimensional vector, determining that the first multi-dimensional vector is correct; and in response to the first multi-dimensional vector not corresponding to the second multi-dimensional vector, correcting the first multi-dimensional vector according to the plurality of first output results.

6. The method for facial beauty prediction of claim 5, wherein correcting the first multi-dimensional vector according to the plurality of first output results comprises:

correcting the first multi-dimensional vector by correcting the first output results according to a preset rule, wherein the preset rule is: correcting the first output results based on a principle that a minimum number of the first output results are modified and a confidence level of the modified first output result is lowest.

7. The method for facial beauty prediction of claim 3, wherein inputting the training set into a facial beauty prediction task network and training the facial beauty prediction task network comprises:

cyclically optimizing parameters of the first sub-task networks using a back propagation algorithm.

8. An apparatus for facial beauty prediction, comprising:

an acquisition module, configured for acquiring an original image and Gaussian noise;

a generation module, configured for generating a fake facial image according to the Gaussian noise;

a determining module, configured for respectively performing a determination on the fake facial image and the original image to obtain a first probability and a second probability;

a generative adversarial network optimization module, configured for optimizing a generative adversarial network in response to a difference between the first probability and the second probability being greater than a preset threshold;

a training set generation module, configured for generating a training set by using the optimized generative adversarial network; and a training module, configured for inputting the training set into a facial beauty prediction task network and training the facial beauty prediction task network to obtain a trained first task network.

9. An electronic device, comprising a memory, a processor, a program stored in the memory and executable by the processor, and a data bus configured for implementing connection and communication between the processor and the memory, wherein the program, when executed by the processor, causes the processor to perform the method for facial beauty prediction of claim 1.

10. A non-transitory computer-readable storage medium, storing one or more programs which, when executed by one or more processors, cause the one or more processors to perform the method for facial beauty prediction of claim 1.

* * * * *